(12) United States Patent
Isono et al.

(10) Patent No.: US 8,376,473 B2
(45) Date of Patent: Feb. 19, 2013

(54) VEHICULAR BRAKE SYSTEM

(75) Inventors: Hiroshi Isono, Mishima (JP); Yasuji Mizutani, Susono (JP)

(73) Assignee: Toyota Jidosha Kabushi Kaisha, Toyota-shi (JP)

( * ) Notice: Subject to any disclaimer, the term of this patent is extended or adjusted under 35 U.S.C. 154(b) by 1156 days.

(21) Appl. No.: 11/996,979

(22) PCT Filed: Jan. 23, 2007

(86) PCT No.: PCT/IB2007/000148
§ 371 (c)(1),
(2), (4) Date: Jan. 28, 2008

(87) PCT Pub. No.: WO2007/088433
PCT Pub. Date: Aug. 9, 2007

(65) Prior Publication Data
US 2008/0210499 A1   Sep. 4, 2008

(30) Foreign Application Priority Data
Jan. 31, 2006   (JP) .................................. 2006-022637

(51) Int. Cl.
*B60T 8/44* (2006.01)
(52) U.S. Cl. ..................................... 303/114.1; 188/358
(58) Field of Classification Search ............... 303/114.1, 303/113.3, 114.2, 116.1, 116.2, 119.1; 188/345, 188/358, 359, 360, 163
See application file for complete search history.

(56) References Cited

U.S. PATENT DOCUMENTS

| | | | |
|---|---|---|---|
| 3,942,844 A * | 3/1976 | Inada et al. | 303/122.13 |
| 4,340,257 A * | 7/1982 | Belart | 303/114.1 |
| 4,743,071 A * | 5/1988 | Iwamoto | 303/3 |
| 6,412,882 B1 | 7/2002 | Isono et al. | |
| 6,604,795 B2 * | 8/2003 | Isono et al. | 303/11 |
| 6,705,682 B2 | 3/2004 | Kusano et al. | |
| 6,729,698 B2 | 5/2004 | Kusano et al. | |
| 6,908,160 B2 | 6/2005 | Kusano | |
| 6,957,870 B2 | 10/2005 | Kagawa et al. | |
| 2004/0004394 A1 * | 1/2004 | Ganzel | 303/114.1 |
| 2004/0227396 A1 | 11/2004 | Kusano | |
| 2006/0158026 A1 * | 7/2006 | Aoki et al. | 303/114.1 |
| 2010/0326073 A1 | 12/2010 | Isono et al. | |

FOREIGN PATENT DOCUMENTS

| | | |
|---|---|---|
| DE | 102 44 375 | 1/2004 |
| EP | 0 296 614 A2 | 12/1988 |
| EP | 0 391 353 | 10/1990 |
| JP | 09-024818 | 1/1997 |
| JP | 2001-225739 A | 8/2001 |
| JP | 2001-294146 A | 10/2001 |
| JP | 2004 243983 | 9/2004 |
| WO | 2004 045934 | 6/2004 |

* cited by examiner

*Primary Examiner* — Xuan Lan Nguyen
(74) *Attorney, Agent, or Firm* — Oblon, Spivak, McClelland, Maier & Neustadt, L.L.P.

(57) ABSTRACT

First hydraulic-pressure supply piping extended from an accumulator is connected to a first supply port (that is, to a second pressure chamber) of a cylinder, and to second hydraulic-pressure delivery piping of an ABS via third hydraulic-pressure supply piping having a third linear valve. When the braking hydraulic pressure Pf is reduced in the ABS, the degree and the period of time that the third linear valve is opened are set according to the amount of fluid discharged from the second hydraulic-pressure delivery piping to a reservoir tank through a pressure-reducing valve so that a certain amount of fluid is returned from the first hydraulic-pressure supply piping to the second hydraulic-pressure delivery piping via the third hydraulic-pressure supply piping.

16 Claims, 10 Drawing Sheets

F I G . 2
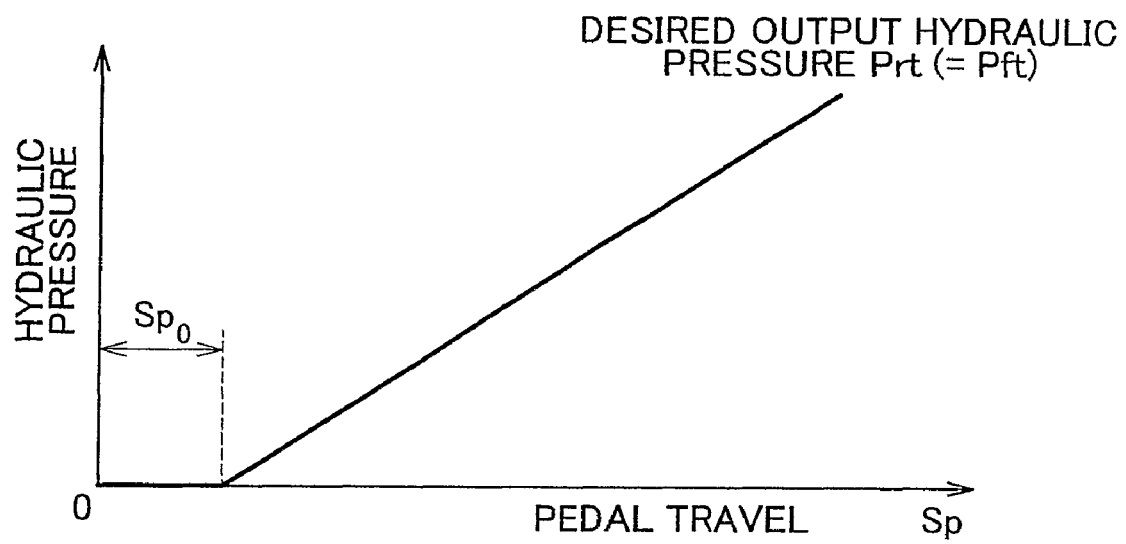

VEHICULAR BRAKE SYSTEM

BACKGROUND OF THE INVENTION

1. Field of the Invention

The present invention relates to a vehicular brake system that electronically controls the braking force to be applied to a vehicle according to the braking operation amount.

2. Description of the Related Art

In an electronically controlled vehicular braking system, the braking force is electronically controlled. Specifically, the hydraulic pressure that is supplied to the wheel cylinders for driving the brake system, is electronically controlled according to the amount of operation applied through a brake pedal. Such a brake system is described in Japanese Patent Application Laid-Open No. 2004-243983, for example.

With regard to the vehicular brake control system described in Japanese Patent Application Laid-Open No. 2004-243983, when a driver operates a brake pedal, a master cylinder generates a hydraulic pressure corresponding to the operation amount, and part of the hydraulic fluid flows into a stroke simulator, so that the operation amount of the brake pedal corresponding to the brake-pedal depression force is regulated. Meanwhile, a brake ECU sets the desired amount of speed reduction of the vehicle according to the pedal travel detected, and then determines the distribution of the braking force to be applied to the wheels to supply a certain hydraulic pressure to the wheel cylinders.

With regard to the conventional vehicular brake control system described above, the master cylinder, which generates the hydraulic pressure corresponding to the operation amount of the brake pedal, is provided with the stroke simulator into which part of the hydraulic fluid flows and which thus regulates the operation amount of the brake pedal. In addition, a pressurizing mechanism for pressurizing the hydraulic fluid to be supplied to the four-system wheel cylinders is provided for each system with a master cylinder cutoff valve interposed between the master cylinder and the pressurizing mechanism. Accordingly, the hydraulic system is complicated, which can make the manufacturing cost high.

SUMMARY OF THE INVENTION

The present invention provides a vehicular brake system that makes it possible to simplify the structure, and to reduce the manufacturing cost, but yet also allows very precise control of the braking force to secure proper braking force.

A vehicular brake system according to the present invention includes: a cylinder; an input piston supported freely movably in an axial direction in the cylinder; an operation part connected to the input piston; a pressurizing piston coaxially disposed with the input piston and supported freely movably in the axial direction in the cylinder, which pressurizing piston can be pushed by the input piston; a control-hydraulic-pressure setting means for setting control hydraulic pressure that corresponds to the amount of operation applied to the input piston through the operation part; a hydraulic-pressure supply means for generating braking hydraulic pressure by supplying the control hydraulic pressure set by the control-hydraulic-pressure setting means to the pressurizing piston; a pressure regulating means capable of regulating the braking hydraulic pressure on a wheel-by-wheel basis, which pressure is generated by the hydraulic-pressure supply means; and a hydraulic pressure source connected to the hydraulic-pressure supply means and the pressure regulating means.

The vehicular brake system according to the present invention may be provided with an operation-force absorbing means for absorbing the operation force applied to the input piston through the operation part.

The vehicular brake system according to the present invention may be characterized in that the hydraulic-pressure supply means supplies the control hydraulic pressure to a first pressure chamber, disposed on one side of the input piston with respect to the moving direction thereof, or to a second pressure chamber, disposed on the other side of the input piston, and the operation-force absorbing means has a communication passage provided in the input piston, with which hydraulic fluid is supplied and/or discharged between the first pressure chamber and the second pressure chamber.

The vehicular brake system according to the present invention may be characterized in that the pressure regulating means includes: a pressure-sustaining valve and a pressure-reducing valve for each wheel; and a flow control valve provided between the hydraulic pressure source and the pressure regulating means, and the degree and the period of time that the flow control valve is opened is set according to the amount of fluid discharged through the pressure-reducing valve.

In the vehicular brake system according to the present invention, the pressure-regulating means may set the degree of opening of the flow control valve based on the amount of fluid to be discharged, and the pressure difference between the hydraulic pressure supplied by the hydraulic pressure source and the braking hydraulic pressure generated by the hydraulic-pressure supply means.

In the vehicular brake system according to the present invention, the pressure regulating means may set the amount of returned fluid which is more than the amount of fluid discharged through the pressure-reducing valve, and may set the degree and the period of time that the flow control valve is opened, according to the amount of returned fluid.

The vehicular brake system according to the present invention may be characterized in that the pressure regulating means determines whether bottoming of the pressurizing piston is occurring by comparing the control hydraulic pressure and the braking hydraulic pressure, and, if it is determined that bottoming is occurring, sets the degree of opening of the flow control valve at a predetermined desired degree.

The vehicular brake system according to the present invention may be characterized in that the desired degree of opening of the flow control valve corresponds to the desired value of the braking hydraulic pressure on the pressurizing piston side, and is set lower than the degree corresponding to the desired value of the control hydraulic pressure on the input piston side.

The vehicular brake system according to the present invention may be characterized in that the pressure regulating means has an initial position detection means for detecting whether the pressurizing piston is at the initial position, and, if the initial position detection means detects that the pressurizing piston is at the initial position, the pressure regulating means closes the flow control valve.

In the vehicular brake system according to the present invention, the pressure regulating means may close the flow control valve once the braking hydraulic pressure drops.

The vehicular brake system according to the present invention may be characterized in that, when the rate of change of the control hydraulic pressure exceeds a predetermined value, the pressure regulating means opens the flow control valve.

In the vehicular brake system according to the present invention, an input piston and a pressurizing piston are coaxially disposed and are supported freely movably in the axial direction of the cylinder. The vehicular brake system includes a control-hydraulic-pressure setting means for setting the control hydraulic pressure that corresponds to the amount of operation applied to the input piston through the operation part, a hydraulic-pressure supply means for generating the braking hydraulic pressure by supplying the control hydraulic pressure to the pressurizing piston, and a pressure regulating means capable of regulating the braking hydraulic pressure, which is generated by the hydraulic-pressure supply means, for each wheel individually; and a hydraulic pressure source is connected to the hydraulic-pressure supply means and the pressure regulating means. Accordingly, once the control hydraulic pressure corresponding to the amount of operation applied to the input piston through the operation part is set, the control hydraulic pressure is applied to the pressurizing piston by the hydraulic pressure source, which causes the braking hydraulic pressure to be generated, so that it is possible to regulate the braking hydraulic pressure for each wheel individually by using the hydraulic pressure supplied from the hydraulic pressure source to the pressure regulating means. Thus, it is possible to simplify the structure and reduce the manufacturing cost by using the same hydraulic pressure source. In addition, it is possible to secure proper braking force to perform highly precise control of the braking force.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein:

FIG. 2 is a graph showing desired output hydraulic pressure corresponding to the pedal travel in the vehicular brake system of the first embodiment;

DETAILED DESCRIPTION OF THE PREFERRED EMBODIMENTS

Embodiments of the vehicular brake system according to the present invention will be described below in detail with reference to the drawings. It should be noted that the present invention is not limited to these embodiments.

First Embodiment

Figure 1:
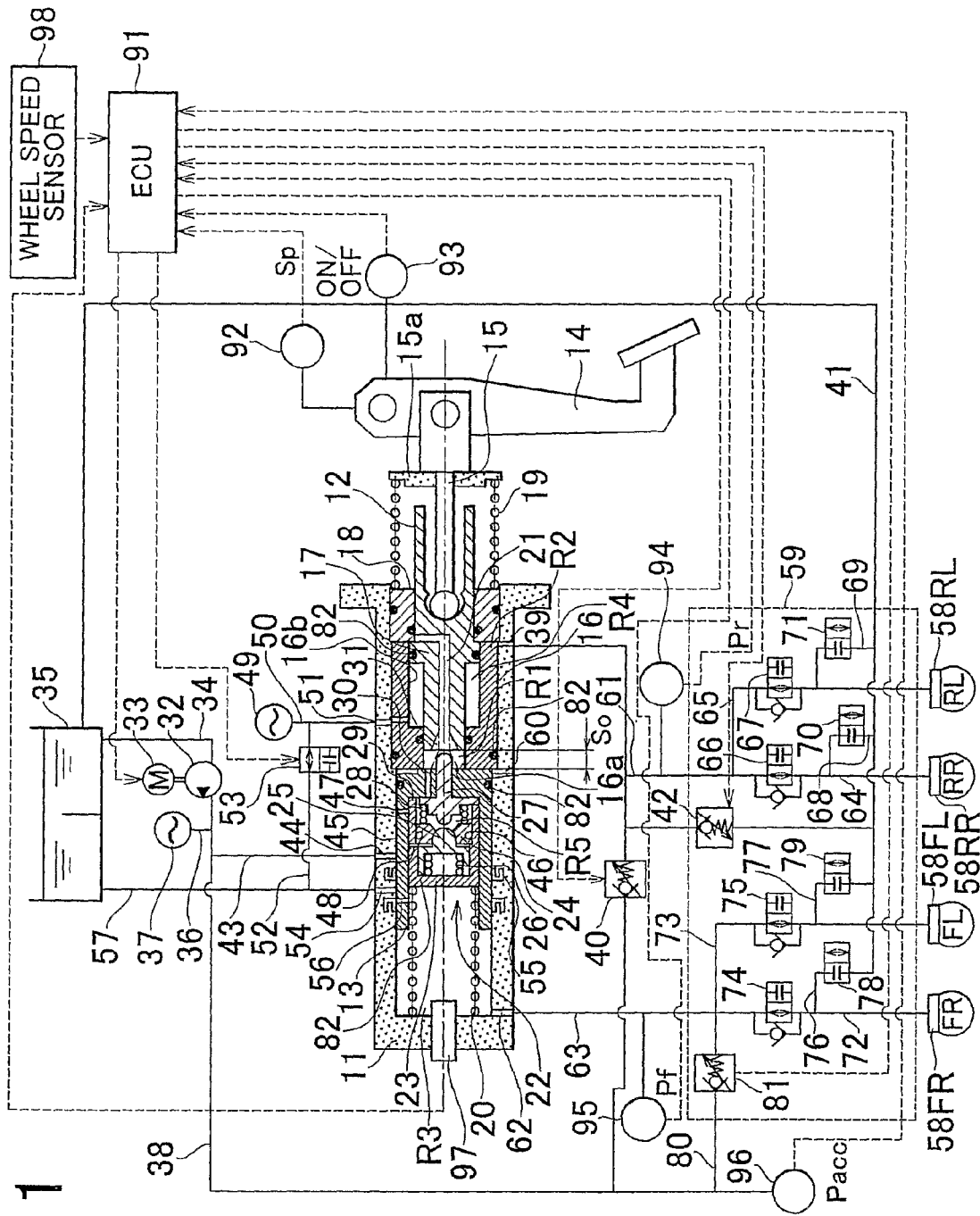
FIG. 1 is a schematic configuration diagram showing the vehicular brake system of a first embodiment of the present invention.

As shown in FIG. 1, in the vehicular brake system of the first embodiment, a cylinder 11 has a cylindrical shape in which the proximal end portion thereof is open, and the distal end portion thereof is closed. In the cylinder 11, an input piston 12 and a pressurizing piston 13 are coaxially disposed, and are supported freely movably in the axis direction. The proximal end portion of the input piston 12, which is disposed in the proximal-end-portion side of the cylinder 11, is connected to an operation rod 15 of a brake pedal 14, which is provided as an operation part. Thus, the input piston 12 is moved via the operation rod 15 when the brake pedal 14 is operated. The outer circumferential surface of a tip portion of the input piston 12 is freely movably supported by an inner surface of a small diameter portion 16a of a support member 16 fixed to the cylinder 11 by pressing or screwing the support member 16 thereinto, and a flange portion 17 of the input piston 12 having a discoid shape is freely movably supported by the inner surface of a large diameter portion 16b of the support member 16. The stroke of the input piston 12 is restricted so that the flange portion 17 comes into contact with an end face of the small diameter portion 16a of the support member 16, and comes into contact with an end face of a support member 18 that is fixed to the cylinder 11 by pressing or screwing the support member 18 thereinto. The input piston 12 is supported in an urged state at such a position that the flange portion 17 abuts the support member 18, via an urging spring 19 provided in a tensioned state between the support member 18 and a flange portion 15a of the operation rod 15.

The pressurizing piston 13 disposed in the proximal-end-portion side of the cylinder 11 has a cross section with a U shape, and the outer circumferential surface of the pressurizing piston 13 is freely movably supported by the inner surface of the cylinder 11. With regard to the pressurizing piston 13, the stroke thereof is restricted so that longitudinal end faces come into contact with the cylinder 11 and the support member 16. At the same time, the pressurizing piston 13 is supported in an urged state at such a position that the pressurizing piston 13 abuts the support member 16, via an urging spring 20 provided in a tensioned state between the pressurizing piston 13 and the cylinder 11. Thus, the input piston 12 and the pressurizing piston 13 are separated by a predetermined space or stroke $S_0$, so that, when the brake pedal 14 is operated, and the input piston 12 advances by the predetermined stroke $S_0$, the input piston 12 contacts the pressurizing piston 13 and it is possible to push the pressurizing piston 13.

When the input piston 12 and the pressurizing piston 13 are coaxially disposed freely movably in the cylinder 11 in this way, a first pressure chamber R1 is formed on one side of the input piston 12 with respect to the moving direction thereof, that is, between the input piston 12 and the pressurizing piston 13, and a second pressure chamber R2 is formed on the other side of the input piston 12 with respect to the moving direction thereof, that is, between the flange portion 17 of the input piston 12 and the support member 18. In addition, a third pressure chamber R3 is formed between the cylinder 11 and the pressure piston 13. Moreover, a reaction-force chamber R4 is formed between the support member 16 and the flange portion 17 of the input piston 12. The first and second pressure chambers R1 and R2 are allowed to communicate with each other through a communication passage 21 having a L shape, which is provided as an operation-force absorbing means formed in the input piston 12.

A regulator 22 is housed in the pressurizing piston 13. Specifically, a hollow housing 23 is fixed by fitting it into the pressurizing piston 13, and a flange 24 having a ring shape is formed in a middle portion in the housing 23. A poppet valve 25 is supported freely movably in the axis direction in one side of the housing 23 (the left side in FIG. 1), and the poppet valve 25 is supported in an urged state at such a position that a tip portion of the poppet valve 25 abuts the flange 24, via a compressed spring 26 provided as an urging member. A load transmitter 27 provided as a mover extending from the first pressure chamber R1 to a fifth pressure chamber R5 of the housing 23 is supported freely movably in the axis direction by the pressurizing piston 13, is urged in a direction away from the poppet valve 25 by a compressed spring 28, and is supported at such a position that a flange portion 29 provided on the distal end side abuts the pressurizing piston 13. In addition, a communication hole 30, which allows the first pressure chamber R1 and the fifth pressure chamber R5 to communicate with each other is formed in the pressurizing piston 13. The tip of the load transmitter 27 projects into the first pressure chamber R1. The tip of the input piston 12, which also serves as an opening end of the communication passage 21, faces the tip portion of the load transmitter 27. The communication passage 21 serves as an orifice (reduced diameter portion).

Accordingly, when the brake pedal 14 is operated, and the input piston 12 advances, a seat portion 31 is brought into close contact with the tip portion of the load transmitter 27, which closes the communication passage 21. When the input piston 12 further advances, the input piston 12 pushes and moves the load transmitter 27, which moves the poppet valve 25 via the load transmitter 27.

A motor 33 drives a hydraulic pump 32, which supplies the hydraulic pressure. The hydraulic pump 32 is connected to a reservoir tank 35 via piping 34, and is connected to an accumulator 37 via piping 36. The accumulator 37 is connected to the second pressure chamber R2 via first hydraulic-pressure supply piping 38 through a first supply port 39 formed in the cylinder 11. A first linear valve 40 is located in the first hydraulic-pressure supply piping 38, and a second linear valve 42 is located in first hydraulic-pressure discharge piping 41 connected between the first hydraulic-pressure supply piping 38 and the reservoir tank 35. The first linear valve 40 and the second linear valve 42 are flow-control solenoid valves. The first linear valve 40 is in a closed state when not energized (Normally Closed), and the second linear valve 42 is in an open state when not energized (Normally Open).

The accumulator 37 is connected to the regulator 22 in the pressurizing piston 13 via second hydraulic-pressure supply piping 43 through a second supply port 44 formed in the cylinder 11. Specifically, the pressurizing piston 13 is fitted into the cylinder 11 with a certain first gap 45 having a ring shape interposed therebetween; the housing 23 is fitted into the pressurizing piston 13 with a certain second gap 46 having a ring shape interposed therebetween; the second supply port 44 communicates with the first gap 45; the first and second gaps 45 and 46 are allowed to communicate with each other via a first communication port 47 formed in the pressurizing piston 13; and the second gap 46 communicates with a space positioned in the poppet-valve side of the housing 23. In addition, a third hydraulic-pressure supply line connecting the regulator 22 and the first pressure chamber R1 is constituted of the fifth pressure chamber R5 and the communication hole 30.

An accumulator 49 having a capacity lower than that of the accumulator 37 is connected to the reaction-force chamber R4 via reaction-force hydraulic-pressure supply piping 50 through a reaction-force supply port 51. A selector valve 53 is located in reaction-force hydraulic-pressure discharge piping 52 connected between the reaction-force hydraulic-pressure supply piping 50 and the reservoir tank 35.

A first discharge port 54 is formed in the cylinder 11. One-way seals 55 are installed on both sides of the first discharge port 54. A second discharge port 56 is formed in the pressurizing piston 13. The third pressure chamber R3 is connected to the reservoir tank 35 via second hydraulic-pressure discharge piping 57 through the first and second discharge ports 54 and 56.

Wheel cylinders 58FR, 58FL, 58RR and 58RL for actuating brakes (not shown) are provided to front wheels FR and FL, and rear wheels RR and RL, respectively, which cylinders can be actuated by an ABS (Antilock Brake System) 59 provided as a pressure regulating means. First hydraulic-pressure delivery piping 61 is connected downstream of the first linear valve 40 in the first hydraulic-pressure supply piping 38, and the first hydraulic-pressure delivery piping 61 is connected to the ABS 59, so that it is possible to supply hydraulic pressure to the wheel cylinders 58RR and 58RL of the rear wheels RR and RL. On the other hand, second hydraulic-pressure delivery piping 63 is connected to a delivery port 62 formed in a wall of the third pressure chamber R3, and the second hydraulic-pressure delivery piping 63 is connected to the ABS 59, so that it is possible to supply hydraulic pressure to the wheel cylinders 58FR and 58FL of the front wheels FR and FL.

In this ABS 59, the first hydraulic-pressure delivery piping 61 is branched into two-branched piping 64 and 65. The first branched piping 64 is connected to the wheel cylinder 58RR of the rear wheel RR, in which piping a first pressure-sustaining valve 66 is located. On the other hand, a second pressure-sustaining valve 67 is provided in the second branched piping 65, which is connected to the wheel cylinder 58RL of the rear wheel RL. The first and second pressure-reducing valves 70 and 71 are located in first and second discharge piping 68 and 69, respectively, which are branched from the first and second branched piping 64 and 65, respectively, and are connected to the first hydraulic-pressure discharge piping 41. The second hydraulic-pressure delivery piping 63 is branched into two-branched piping 72 and 73. A third pressure-sustaining valve 74 is provided in the third branched piping 72, which is connected to the wheel cylinder 58FR of the front wheel FR. On the other hand, a fourth pressure-sustaining valve 75 is provided in the fourth branched piping 73, which is connected to the wheel cylinder 58FL of the front wheel FL. Third and fourth pressure-reducing valves 78 and 79 are located in third and fourth discharge piping 76 and 77, respectively, which are branched from the third and fourth branched piping 72 and 73, respectively, and are connected to the first hydraulic-pressure discharge piping 41. In addition, third hydraulic-pressure supply piping 80 connected between the first hydraulic-pressure supply piping 38 and the second hydraulic-pressure delivery piping 63 is provided, and a third linear valve 81 is located in the third hydraulic-pressure supply piping 80. The third linear valve 81 is a flow-control solenoid valve, and is in a closed state when not energized (Normally Closed).

O-rings 82 are installed on important parts, such as the cylinder 11, the input piston 12, the pressurizing piston 13 and the regulator 22 to prevent leakage of hydraulic pressure.

In the brake system according to this embodiment, an electronic control unit (ECU) 91 allows braking force to be applied to the front wheels FR and FL, and the rear wheels RR and RL in the following procedure: a control hydraulic pressure corresponding to the amount of operation applied to the input piston 12 through the brake pedal 14 (pedal travel) is set (control hydraulic-pressure setting means); the control hydraulic pressure thus set is applied to the input piston 12 and the pressurizing piston 13 to generate braking hydraulic pressure (hydraulic-pressure supply means); and the wheel cylinders 58FR, 58FL, 58RR and 58RL are actuated by the ABS 59. The ABS 59 controls the braking hydraulic pressure supplied to the wheel cylinders 58FR, 58FL, 58RR and 58RL individually by controlling opening and closing of the pressure-sustaining valves 66, 67, 74 and 75, and the pressure-reducing valves 70, 71, 78 and 79.

In this embodiment, the control hydraulic pressure set by the second linear valve 40 is supplied to first and second pressure chambers R1 and R2 of the input piston 12, and is thus applied to the input piston 12 and the pressurizing piston 13, whereby the braking hydraulic pressure to be supplied to the wheel cylinders 58FR and 58FL is generated in the third pressure chamber R3. In addition, the control hydraulic pressure set by the second linear valve 40 is supplied to the wheel cylinders 58RR and 58RL as the braking hydraulic pressure.

In addition, in this embodiment, the operation force applied to the input piston 12 through the brake pedal 14 is absorbed so that the pushing force of the input piston 12 cannot be transmitted to the pressurizing piston 13, and that the pushing force is not allowed to act on the brake pedal 14 as a reaction force of operation. In this case, as described above, the operation-force absorbing means includes: the communication passage 21 allowing the first pressure chamber R1 and the second pressure chamber R2 to communicate with each other; and the predetermined space $S_0$ between the input piston 12 and the pressurizing piston 13. When a malfunction occurs in the solenoid valves, the operation force applied through the brake pedal 14 causes the input piston 12 to directly push the pressurizing piston 13 and simultaneously causes the regulator 22 to operate so that the proper braking hydraulic pressure is generated.

Specifically, the brake pedal 14 is provided with a travel sensor 92 for detecting the pedal travel Sp of the brake pedal 14, and a brake switch 93, which detects pedal depression force and is correspondingly switched on and off, to output the pedal travel Sp detected and the ON/OFF signal to the ECU 91. The first and second hydraulic-pressure delivery piping 61 and 63 are provided with first and second pressure sensors 94 and 95 for detecting the braking hydraulic pressure. The first pressure sensor 94 detects the braking hydraulic pressure Pr, which is supplied to the wheel cylinders 58RR and 58RL of the rear wheels RR and RL via the first hydraulic-pressure delivery piping 61, and outputs the detection result to the ECU 91. On the other hand, the second pressure sensor 95 detects the braking hydraulic pressure Pf, which is supplied from the third pressure chamber R3 to the wheel cylinders 58FR and 58FL of the front wheels FR and FL via the second hydraulic-pressure delivery piping 63, and outputs the detection result to the ECU 91.

A third pressure sensor 96 is provided to the first hydraulic-pressure supply piping 38 extended from the accumulator 37. The third pressure sensor 96 detects an accumulator pressure Pacc built up in the accumulator 37, and outputs the detection result to the ECU 91. The cylinder 11 is provided with a piston travel sensor 97 as an initial position detection means for detecting whether the pressurizing piston 13 is placed at the initial position (the position shown in FIG. 1). The piston travel sensor 97 outputs the ON/OFF signal, which is the detection result, to the ECU 91. In addition, each of the front wheels FR and FL, and the rear wheels RR and RL is provided with a wheel speed sensor 98. The wheel speed sensors 98 output the detected wheel speeds to the ECU 91.

The ECU 91 sets a desired output hydraulic pressure Prt on the basis of the pedal travel Sp detected by the stroke sensor 92 as shown in FIG. 2, and controls the degree of opening of the first and second linear valves 40 and 42. Meanwhile, the ECU 91 feeds back the braking hydraulic pressure Pr detected by the first pressure sensor 94 to perform control so that the desired output hydraulic pressure Prt and the braking hydraulic pressure Pr become equal to each other. In this case, the ECU 91 has a map of the desired output hydraulic pressure Prt plotted against the pedal travel Sp, and controls the linear valves 40 and 42 on the basis of the map. In other words, the braking hydraulic pressure Pr is set on the basis of the pedal travel Sp and the functional map between them, which is set in advance. It should be noted that the braking hydraulic pressure Pf is nearly equal to the braking hydraulic pressure Pr, and that Pr=fSp (where f is the function of travel and hydraulic pressure). The initial pedal travel $Sp_0$ may be the predetermined stroke $S_0$ to be described later, or may be set at a different value.

In this embodiment, one hydraulic pressure source is used as a hydraulic pressure source for supplying hydraulic pressure to a master cylinder, and also as a hydraulic pressure source for supplying hydraulic pressure to the ABS 59. Specifically, as described above, the first hydraulic-pressure supply piping 38 extended from the accumulator 37 is connected to the first supply port 39 (that is, to the second pressure chamber R2 of the cylinder 11), while the first hydraulic-pressure supply piping 38 is connected to the second hydraulic-pressure delivery piping 63 of the ABS 59 via the third hydraulic-pressure supply piping 80 having the third linear valve 81. Thus, in the ABS 59, when the braking hydraulic pressure Pf is regulated or reduced, the degree and the period of time that the third linear valve (the flow control valve) 81 is opened are set according to the amount of fluid discharged from the second hydraulic-pressure delivery piping 63 to the reservoir tank 35 through the pressure-reducing valves 78 and 79, so that a certain amount of fluid is returned from the first hydraulic-pressure supply piping 38 to the second hydraulic-pressure delivery piping 63 via the third hydraulic-pressure supply piping 80 to prevent the lack of the braking hydraulic pressure Pf.

Figure 3:
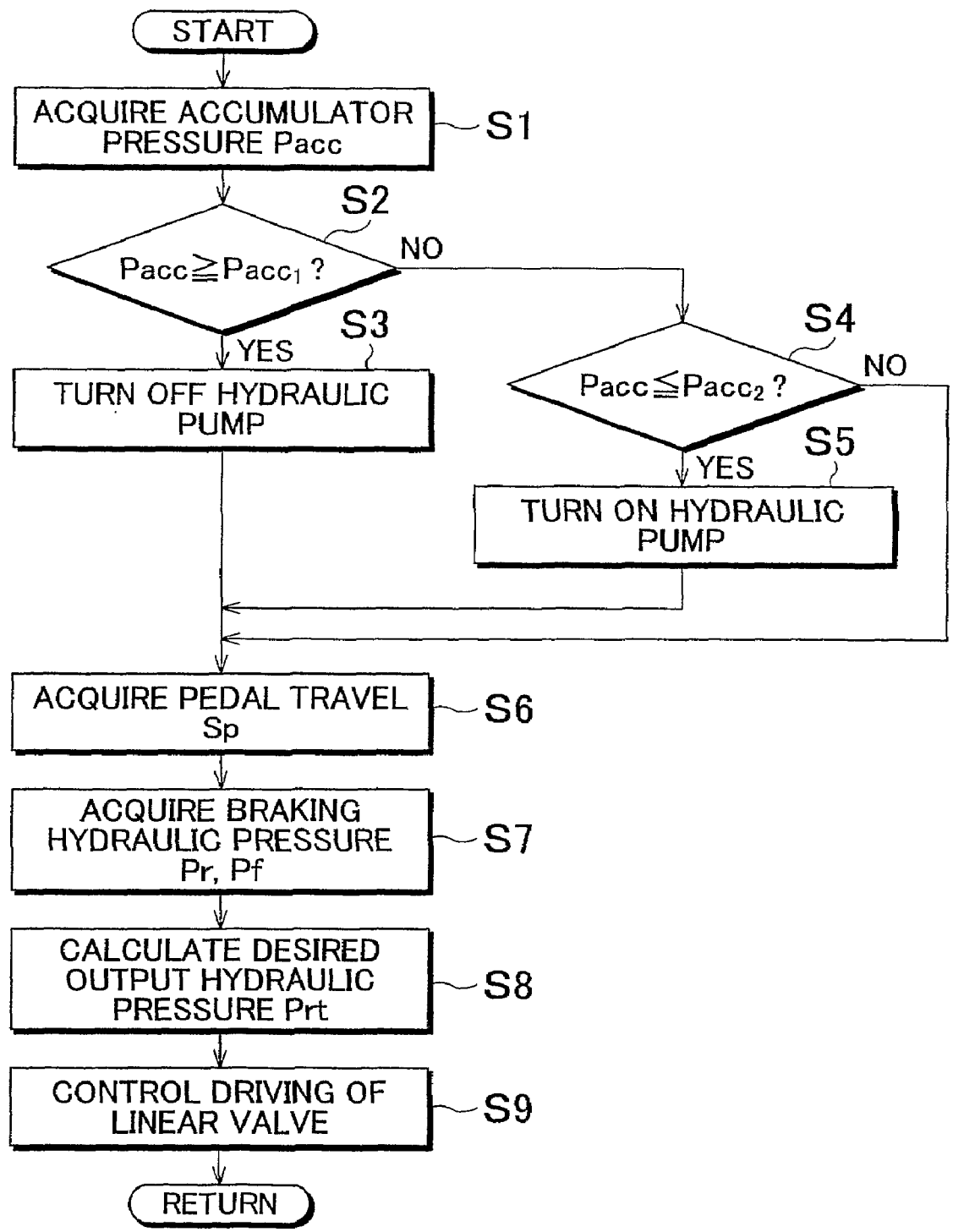
FIG. 3 is a flow chart showing braking-force control performed by the vehicular brake system of the first embodiment.

Description will now be given of braking-force control performed by the ECU 91 in the vehicular brake system of this embodiment with reference to the flow chart shown in FIG. 3. As show in FIG. 3, in step S1 of the braking-force control performed by the ECU 91, the ECU 91 acquires the accumulator pressure Pacc detected by the third pressure sensor 96. In step S2, it is determined whether the accumulator pressure Pacc detected by the third pressure sensor 96 is equal to or higher than a predetermined first accumulator pressure $Pacc_1$ set in advance. If the current accumulator pressure Pacc is equal to or higher than the first accumulator pressure $Pacc_1$, the motor 33 of the hydraulic pump 32 is stopped in step S3. On the other hand, if the current accumulator pressure Pacc is lower than the first accumulator pressure $Pacc_1$, it is determined whether the current accumulator pressure Pacc is equal to or lower than a predetermined second accumulator pressure $Pacc_2$ set in advance, in step S4. If the current accumulator pressure Pacc is equal to or lower than the second accumulator pressure $Pacc_2$, the motor 33 of the hydraulic pump 32 is driven in step S5.

In step S6, the ECU 91 acquires the pedal travel Sp detected by the travel sensor 92. Subsequently, in step S7, the ECU 91 acquires the braking hydraulic pressure Pr detected by the first pressure sensor 94, and the braking hydraulic pressure Pf detected by the second pressure sensor 95. In step S8, the ECU 91 calculates the desired output hydraulic pressure Prt on the basis of the pedal travel Sp by using the preset map. In step S9, the ECU controls the degree of opening of the first and second linear valves 40 and 42 on the basis of the calculated, desired output hydraulic pressure Prt. At this time, the ECU 91 feeds back the braking hydraulic pressure Pr to perform a control to equalize the desired output hydraulic pressure Prt and the braking hydraulic pressure Pr.

Specifically, in the brake system of this embodiment, as shown in FIG. 1, while the battery provided as a power source is in a normal condition, and the ECU 91 can normally perform opening-and-closing operation and degree-of-opening control operation of the first and second linear valves 40 and 42, when the brake pedal 14 is operated, the operation force causes the input piston 12 to advance (move to the left in FIG. 1). In this case, although the input piston 12 advances, since the predetermined stroke $S_0$ is provided between the input piston 12 and the pressurizing piston 13, the input piston 12 does not directly push the pressurizing piston 13. Instead, the hydraulic fluid in the first pressure chamber R1 flows into the second pressure chamber R2 through the communication passage 21. Thus, the input piston 12 is in a free state, and there is no reaction force applied from the first pressure chamber R1 to the brake pedal 14 through the input piston 12. However, a reacting hydraulic pressure is supplied from the accumulator 49 to the reaction-force chamber R4 via the reaction-force hydraulic-pressure supply piping 50, whereby a proper reaction force is applied to the brake pedal 14.

When the brake pedal 14 is operated in this way, the input piston 12 advances. As a result, the travel sensor 92 detects the pedal travel Sp, and the ECU 91 sets the desired output hydraulic pressure Prt on the basis of the pedal travel Sp. Subsequently, the ECU 91 controls the degree of opening of the first and second linear valves 40 and 42 on the basis of the desired output hydraulic pressure Prt, supplies a certain control hydraulic pressure from the first hydraulic pressure supply piping 38 to the ABS 59 via the first hydraulic pressure delivery piping 61, and supplies a certain control hydraulic pressure to the second pressure chamber R2.

As a result, the control hydraulic pressure is supplied to the ABS 59 as the braking hydraulic pressure Pr and to the wheel cylinders 58RR and 58RL after the pressure is regulated in the pressure-sustaining valves 66 and 67, and the pressure-reducing valves 70 and 71, so that it is possible to generate braking force corresponding to the operation force exerted on the brake pedal 14 for the rear wheels RR and RL. The control hydraulic pressure supplied from the first hydraulic-pressure supply piping 38 to the second pressure chamber R2 is supplied to the first pressure chamber R1 via the communication passage 21, and then, a certain braking hydraulic pressure Pf is supplied from the third pressure chamber R3 to the second hydraulic-pressure delivery piping 63. Thus, the braking hydraulic pressure Pf is supplied to the wheel cylinders 58FR and 58FL after the pressure is regulated in the pressure-sustaining valves 74 and 75, and the pressure-reducing valves 78 and 79, so that it is possible to generate braking force corresponding to the operation force exerted on the brake pedal 14 for the front wheels FR and FL.

In this case, when the input piston 12 advances due to the operation force of the brake pedal 14, and a certain control hydraulic pressure is then supplied to the second pressure chamber R2, the pressures in the first and second pressure chambers R1 and R2 are equalized. The input piston 12 therefore does not come into contact with either the pressurizing piston 13 or the load transmitter 27 of the regulator 22, and a state is maintained where the second hydraulic-pressure supply piping 43 and the fifth pressure chamber R5 of the regulator 22 are isolated from each other by the poppet valve 25.

Once the input piston 12 and the pressurizing piston 13 move with a certain space interposed therebetween, and the first and second discharge ports 54 and 56 are cut off from each other, the third pressure chamber R3 is pressurized due to the movement of the pressurizing piston 13. When the hydraulic pressures in the first and third pressure chambers R1 and R3 are balanced according to the control hydraulic pressure supplied to the first pressure chamber R1 in this way, the braking hydraulic pressures Pr and Pf in the respective hydraulic-pressure delivery piping 61 and 63 become substantially equal to each other.

With regard to this embodiment, the first pressure-receiving surface area of the input piston 12 (the surface area of the tip portion thereof) is set smaller than the second pressure-receiving surface area of the pressurizing piston 13 (the surface area of the tip portion), so that a certain servo ratio is obtained. In order for a maximum hydraulic pressure supplied from the first pressure chamber R1 to the fifth pressure chamber R5 of the regulator 22 not to open the poppet valve 25 when a maximum control pressure is supplied to the first pressure chamber R1 via the linear valves 40 and 42, the urging force of the compressed spring 26 is set so that the urging force satisfies the following formula:

(Area to be sealed in the poppet valve)×(Maximum control hydraulic pressure of the linear valve)< (Urging force of the compressed spring 26)

In the case where the braking hydraulic pressures Pr and Pf are controlled to adequate hydraulic pressures by the master cylinder and the ABS 59, and are supplied to the respective wheel cylinders 58RR, 58RL, 58FR and 58FL to generate a certain braking force for each of the front wheels FR and FL, and the rear wheels RR and RL, when the braking hydraulic pressure Pf is reduced by opening and closing the pressure reducing valves 78 and 79 by using the ABS 59, the hydraulic fluid in the second hydraulic-pressure delivery piping 63 is discharged to the reservoir tank 35 through the pressure-reducing valves 78 and 79, which results in the shortage of the hydraulic fluid in the second hydraulic-pressure delivery piping 63. For this reason, in this embodiment, the degree and the period of time that the third linear valve 81 is opened are controlled according to the amount of fluid discharged from the second hydraulic-pressure delivery piping 63 so that a certain amount of fluid is returned from the first hydraulic-pressure supply piping 38 to the second hydraulic-pressure delivery piping 63 via the third hydraulic-pressure supply piping 80.

Figure 4:
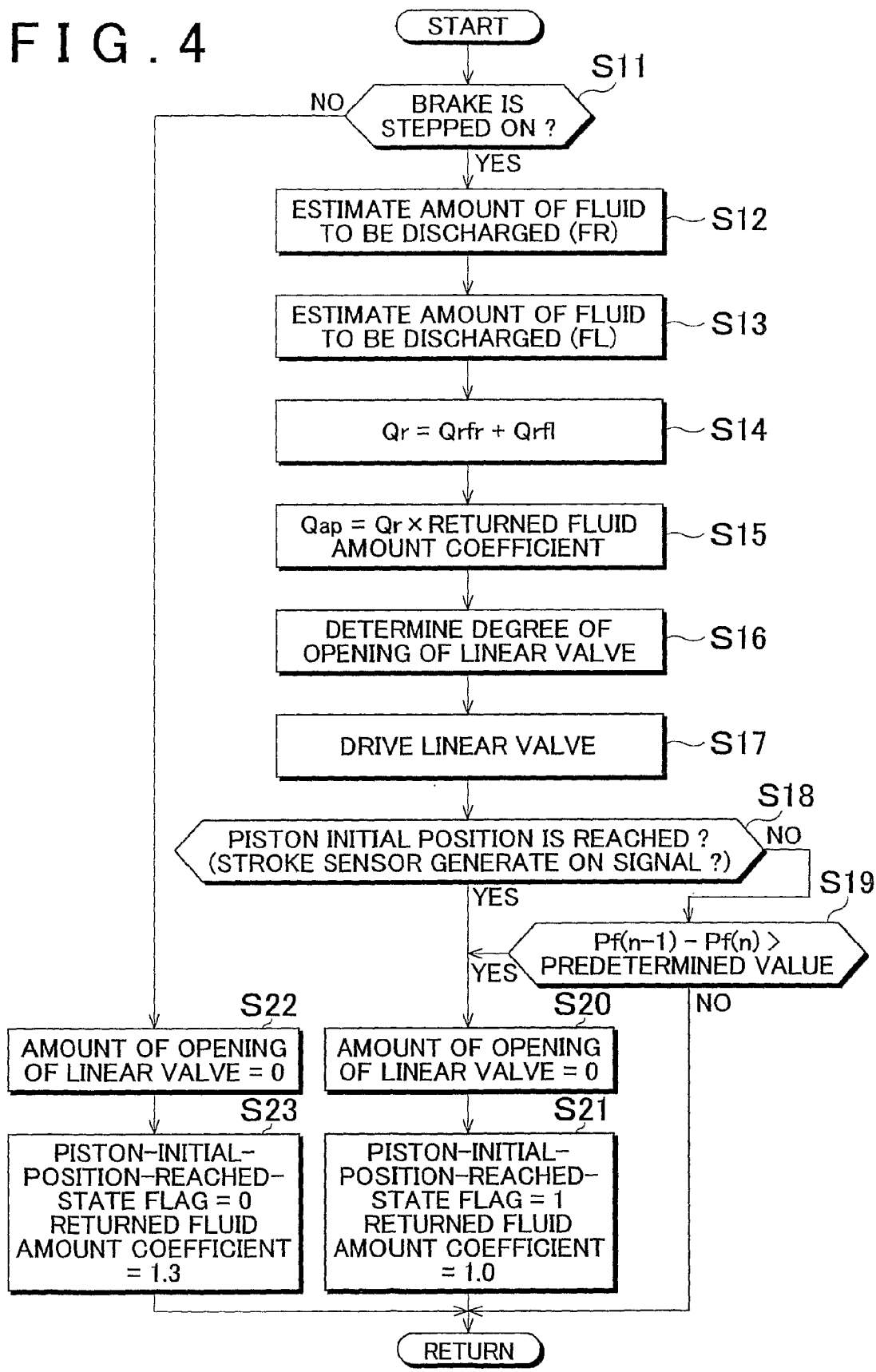
FIG. 4 is a flow chart showing control of the amount of fluid to be returned which is performed by the vehicular brake system of the first embodiment.
Figure 5:
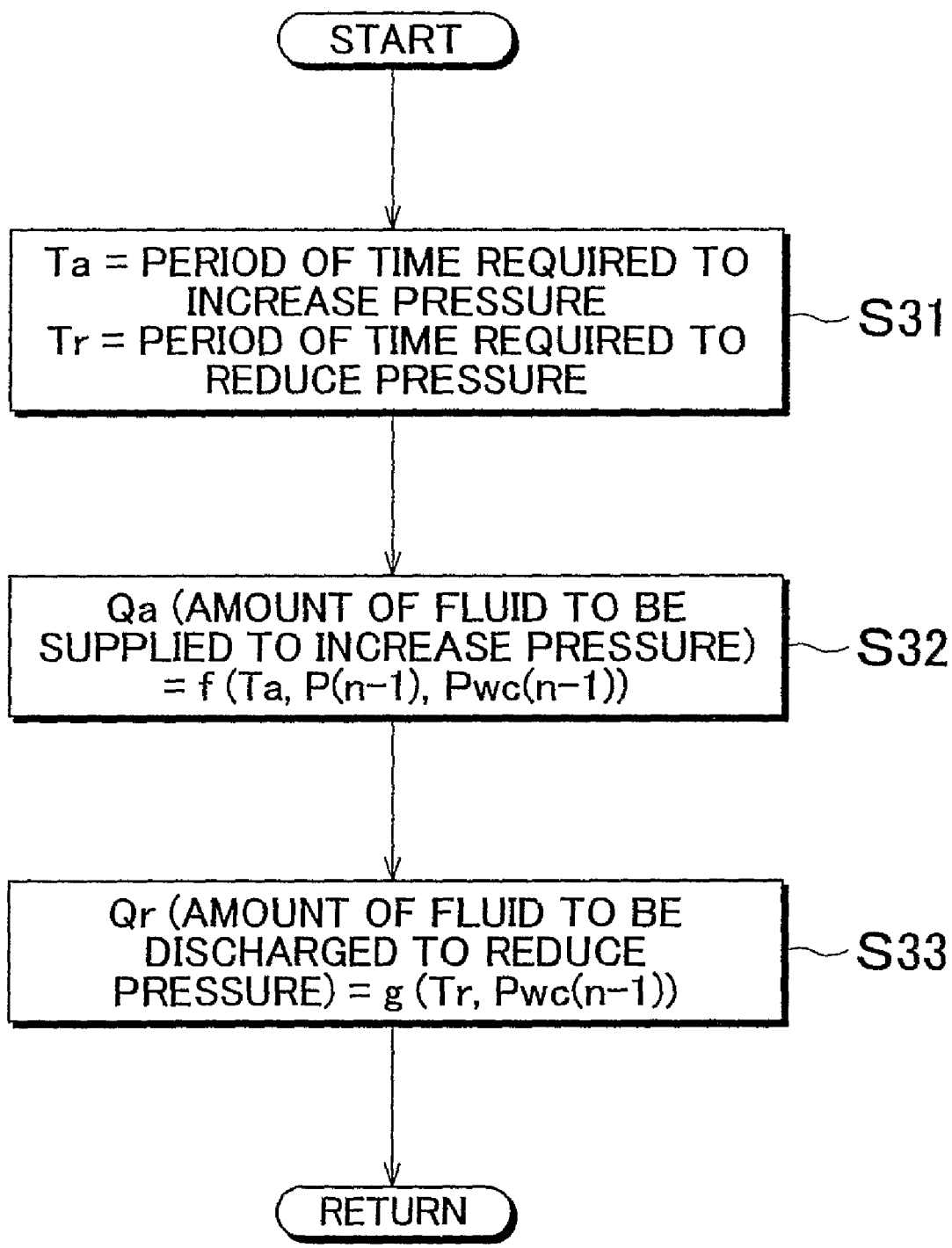
FIG. 5 is a flow chart showing a process of estimating the amount of fluid to be discharged.
Figure 6:
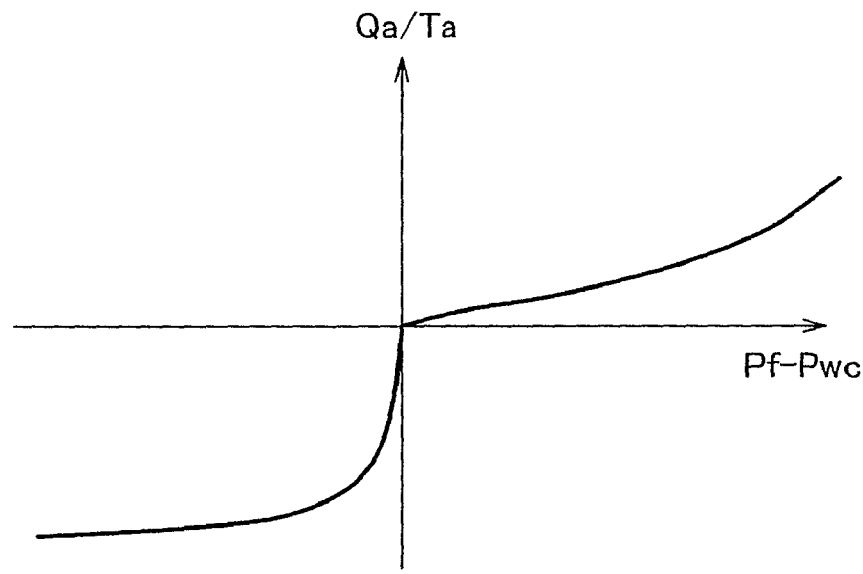
FIG. 6 is a graph used for estimating wheel cylinder pressure.

With regard to control of the amount of fluid to be returned which is performed by the vehicular brake system of the first embodiment, as shown in FIG. 4, depression of the brake pedal 14 is detected on the basis of the reception of the ON signal from the brake switch 93 in step S1. If it is determined that the ON signal from the brake switch 93 is received, the amount of fluid Qrfr and Qrfl to be discharged to reduce pressure (the discharged-fluid amount) is estimated for the front wheels FR and FL in steps S12 and S13. With regard to a process of estimating the discharged-fluid amount, as shown in FIG. 5, the period of time Ta required to increase pressure, and the period of time Tr required to reduce pressure are read in step S31, and, in step S32, a wheel cylinder pressure Pwc is estimated from a relational expression between the amount of fluid Qa to be supplied to increase pressure, and the period of time Ta required to increase pressure, the braking hydraulic pressure Pf, and the wheel cylinder pressure Pwc by using the map shown in FIG. 6. Specifically, for the wheel cylinders 58FR and 58FL, the amount of fluid Qa to be supplied to increase pressure is calculated from the period of time Ta required to increase pressure, which is calculated from the opening time period of the pressure-sustaining valves 74 and 75, and the diameter of the second hydraulic-pressure delivery piping 63, and the wheel cylinder pressure Pwc is estimated from the graph (FIG. 6) in which the pressure difference between the braking hydraulic pressure Pf and the wheel cylinder pressure Pwc is plotted in relation to the amount of fluid to be supplied to increase pressure per unit time Qa/Ta.

Figure 7:
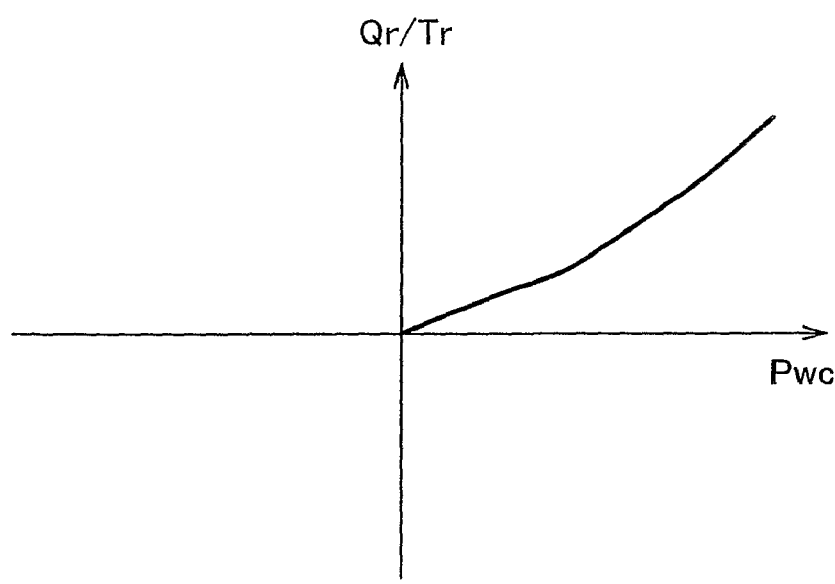
FIG. 7 is a graph used for estimating the amount of fluid to be discharged.

Subsequently, in step S33, the amount of fluid Qr to be discharged to reduce pressure is estimated from a relational expression between the amount of fluid Qr to be discharged to reduce pressure, the period of time Tr required to reduce pressure, and the wheel cylinder pressure Pwc by using the map shown in FIG. 7. Specifically, for the wheel cylinders 58FR and 58FL, the amount of fluid Qr to be discharged to reduce pressure is estimated from the graph (FIG. 7) in which the amount of fluid to be discharged to reduce pressure per unit time Qr/Tr is plotted in relation to the wheel cylinder pressure Pwc.

Figure 8:
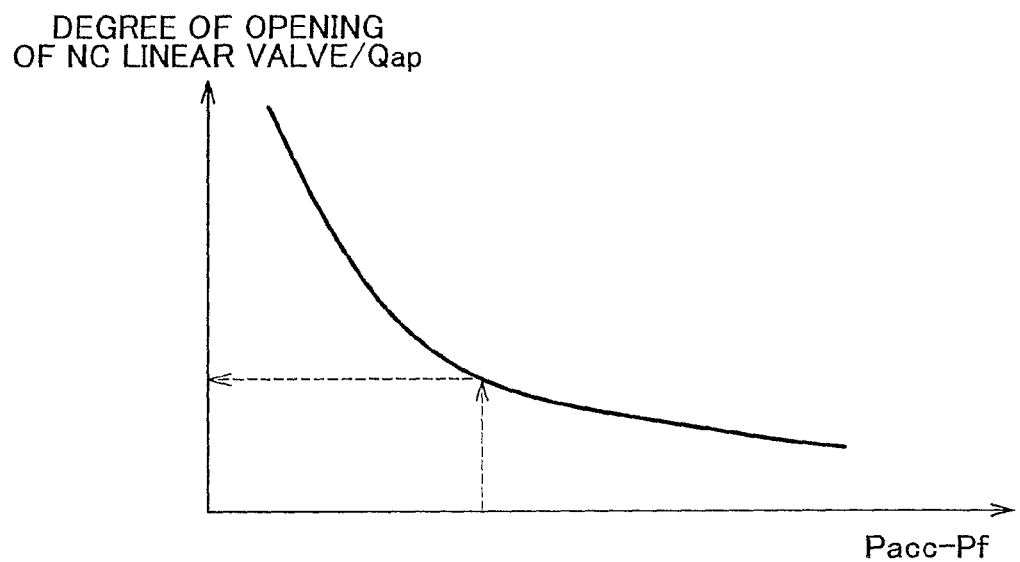
FIG. 8 is a graph for setting the degree of opening of a third linear valve.
Figure 9:
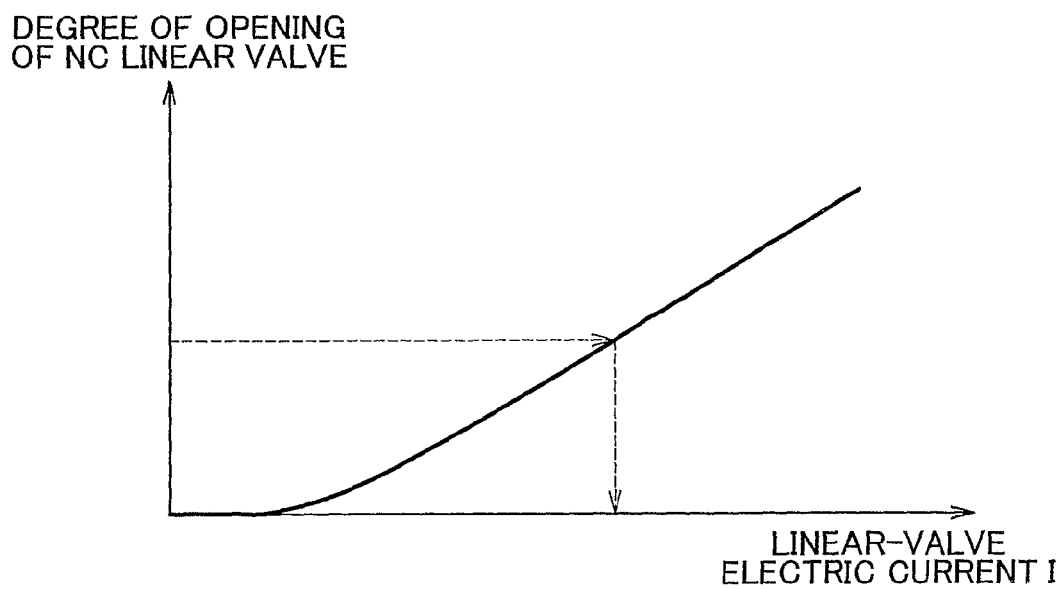
FIG. 9 is a graph for setting a linear-valve electric current to be supplied to the third linear valve.

Referring back to the flow chart shown in FIG. 4, in step S14, the total amount of fluid Qr to be discharged to reduce pressure is calculated by adding the amount of fluid Qrfr and Qrfl to be discharged to reduce pressure estimated for the front wheels FR and FL. In step S15, the required flow rate Qap is set by multiplying the amount of fluid Qr to be discharged to reduce pressure by the coefficient of the amount of returned fluid, which is 1.3 in this embodiment. In step S16, the degree of opening of the third linear valve 81 is determined from the maps shown in FIGS. 8 and 9. Specifically, the degree of linear-valve opening required per reference flow rate is determined from the pressure difference between the accumulator pressure Pacc and the braking hydraulic pressure Pf on the basis of the graph shown in FIG. 8, and the degree of linear-valve opening required per reference flow rate is multiplied by the required flow rate Qap, whereby the degree of opening of the third linear valve 81 is calculated. The linear-valve electric current I is set on the basis of the graph shown in FIG. 9.

In step S17, the third linear valve 81 is driven according to the set linear-valve electric current I. As a result, substantially the same amount of hydraulic fluid as the amount of fluid discharged from the second hydraulic-pressure delivery piping 63 to the reservoir tank 35 through the pressure-reducing valves 78 and 79 during the control of the ABS 59 is returned from the first hydraulic-pressure supply piping 38 to the second hydraulic-pressure delivery piping 63 via the third hydraulic-pressure supply piping 80, according to the degree of opening of the third linear valve 81. Thereafter, in step S18, whether the pressurizing piston 13 has been returned to the initial position is determined from the ON signal from the piston travel sensor 97. If the pressurizing piston 13 has not been returned to the initial position, it is determined whether the amount of change in the braking hydraulic pressure Pf is higher than a predetermined value, that is, whether the braking hydraulic pressure Pf has dropped after the pressurizing piston 13 is returned to a position near the initial position, which allows the first and second discharge ports 54 and 56 to communicate with each other, and, as a result, the hydraulic fluid in the third pressure chamber R3 is discharged to the reservoir tank 35 via the second hydraulic-pressure discharge piping 57, in step S19. If the amount of change in the braking hydraulic pressure Pf is lower than the predetermined value, the degree of opening of the third linear valve 81 is maintained.

On the other hand, in the case where the brake switch 93 is in an ON state, and the ABS 59 is being controlled, if, in step S18, it is determined from the ON signal from the piston travel sensor 97 that the pressurizing piston 13 is returned to the initial position, or if, in step S19, it is determined that the amount of change in the braking hydraulic pressure Pf is higher than the predetermined value, the degree of opening of the third linear valve 81 is set to 0, that is, the third linear valve 81 is closed in step S20. Thereafter, in step S21, a piston-initial-position-reached-state flag is set to 1, and the coefficient of the amount of returned fluid is changed to 1.0. If the brake switch 93 is turned off, the degree of opening of the third linear valve 81 is set to 0 in step S22, and, in step S23, the piston-initial-position-reached-state flag is set to 0, and the coefficient of the amount of returned fluid is changed to 1.3.

With regard to this embodiment, whether the pressurizing piston 13 has been returned to the initial position is determined from the ON signal from the piston travel sensor 97 in step S18, and whether the pressurizing piston 13 has returned to the initial position is determined from the amount of change in the braking hydraulic pressure Pf in step S19. However, a magnetic switch may be provided between the cylinder 11 and the pressurizing piston 13, and whether the pressurizing piston 13 has been returned to the initial position may be determined from the ON signal from the magnetic switch.

In the meantime, in the vehicular brake system of this embodiment, if the battery is down, and the ECU 91 therefore cannot perform opening-and-closing operation and degree-of-opening control operation of the first and second linear valves 40 and 42, the first linear valve 40 is maintained in a closed state, and the second linear valve 42 is maintained in an open state. Under this condition, when the brake pedal 14 is operated, although the operation force causes the input piston 12 to advance, the input piston 12 does not directly push the pressurizing piston 13 because the predetermined stroke $S_0$ is provided between the input piston 12 and the pressurizing piston 13. Instead, as in the case described above, the hydraulic fluid in the first pressure chamber R1 flows into the second pressure chamber R2 through the communication passage 21. The hydraulic pressure in the second pressure chamber R2 is released from the first supply port 39 into the reservoir tank 35 via the first hydraulic-pressure discharge piping 41, which enables the input piston 12 to move until the input piston 12 comes into contact with the pressurizing piston 13 or the load transmitter 27 of the regulator 22.

Once the input piston 12 travels the stroke $S_0$, and the tip portion thereof comes into contact with the load transmitter 27 of the regulator 22, the seat portion 31 comes into close contact with the tip portion of the load transmitter 27, whereby the communication passage 21 is closed, and the communication between the first pressure chamber R1 and the reservoir tank 35 is cut off. When the input piston 12 further advances, the input piston 12 pushes and moves the load transmitter 27, and thus pushes and moves the poppet valve 25 via the load transmitter 27, whereby the second hydraulic-pressure supply piping 43 and the fifth pressure chamber R5 are allowed to communicate with each other. As a result, the hydraulic pressure of the accumulator 37 is supplied from the second hydraulic-pressure supply piping 43 to the fifth pressure chamber R5 through the second supply port 44, the first gap 45, the first communication port 47, the second gap 46, the second communication port 48, and the poppet valve 25, and is further supplied to the first pressure chamber R1 through the communication hole 30.

Thus, when the input piston 12 and the pressurizing piston 13 advance while abutting each other, the hydraulic pressure of the accumulator 37 is supplied to the first pressure chamber R1, whereby the pressurizing piston 13 advances (slides to the left in FIG. 1) due to the pressure difference between the front and rear sides of the pressurizing piston 13. The third pressure chamber R3 is pressurized when the pressurizing piston 13 advances in this way, whereby a certain braking hydraulic pressure Pf is supplied from the third pressure chamber R3 to the second hydraulic-pressure delivery piping 63. Then, the braking hydraulic pressure Pf is supplied to the wheel cylinders 58FR and 58FL via the ABS 59. In this way, it is possible to generate braking force corresponding to the operation force exerted on the brake pedal 14, for the front wheels FR and FL, and the rear wheels RR and RL.

When there is no further depression of the brake pedal 14, that is, the brake pedal 14 is maintained at a constant position, the load transmitter 27 stops pushing the poppet valve 25 by the load transmitter 27, and the second hydraulic-pressure supply piping 43 and the fifth pressure chamber R5 are isolated from each other, while the seat portion 31 of the input piston 12 abuts the load transmitter 27, and the communication passage 21 is therefore closed. Thus, the first pressure chamber R1 and the third pressure chamber R3 are closed, and it is therefore possible to maintain the braking hydraulic pressure Pf to be delivered to the ABS 59.

When the brake pedal 14 is released, the seat portion 31 of the input piston 12 comes away from the load transmitter 27, and the communication passage 21 is opened. As a result, the hydraulic pressure in the first pressure chamber R1 is released into the second pressure chamber R2 through the communication hole 21, and into the reservoir tank 35 through the first supply port 39 and the first hydraulic-pressure discharge piping 41. Meanwhile, when the brake pedal 14 is released, the input piston 12 moves back, and the pressurizing piston 13 moves back due to the urging force of the urging spring 20. As a result, the hydraulic pressure in the third pressure chamber R3 is released into the reservoir tank 35 through the second discharge port 54 and the second hydraulic-pressure discharge piping 57. Thus, it is possible to reduce the braking hydraulic pressure Pf to be delivered to the ABS 59 by reducing the hydraulic pressures in the first and third pressure chambers R1 and R3.

As described above, with regard to the vehicular brake system of the first embodiment, the input piston 12 and the pressurizing piston 13 are supported freely movably in the cylinder 11, and it is made possible to push the pressurizing piston 13 via the input piston 12. The brake pedal 14 is coupled to the input piston 12. The pressure chambers R1 and R2 placed longitudinally adjacent to the input piston 12 are allowed to communicate with each other via the communication passage 21. In this way, the vehicular brake system is designed so that the control hydraulic pressure, which corresponds to the operation amount of the brake pedal 14, can be supplied to the second pressure chamber R2 via the first and second linear valves 40 and 42, and is supplied to the wheel cylinders 58FR, 58FL, 58RR and 58RL by using this control hydraulic pressure and the control hydraulic pressure caused by the movement of the pressurizing piston 13.

Thus, the ECU 91 sets the desired output hydraulic pressure Prt that corresponds to the pedal travel Sp, and supplies the control hydraulic pressure to the first pressure chamber R1 according to the desired output hydraulic pressure Prt, thereby supplying a certain braking hydraulic pressure Pr to the first hydraulic-pressure delivery piping 61, and supplying a certain braking hydraulic pressure Pf from the third pressure chamber R3 to the second hydraulic-pressure delivery piping 63. The ECU 91 thus supplies the braking hydraulic pressures Pr and Pf to the wheel cylinders 58FR, 58FL, 58RR and 58RL via the ABS 59. In this way, it is possible to generate a proper braking force corresponding to the operation force exerted on the brake pedal 14, for the front wheels FR and FL, and the rear wheels RR and RL.

In the vehicular brake system of this embodiment, one hydraulic pressure source is used as a hydraulic pressure source for supplying hydraulic pressure to a master cylinder, and also as a hydraulic pressure source for supplying hydraulic pressure to the ABS 59. Specifically, the first hydraulic-pressure supply piping 38 extended from the accumulator 37 is connected to the first supply port 39 (that is, to the second pressure chamber R2), while the first hydraulic-pressure supply piping 38 is connected to the second hydraulic-pressure delivery piping 63 of the ABS 59 via the third hydraulic-pressure supply piping 80 having the third linear valve 81. Thus, in the ABS 59, when the braking hydraulic pressure Pf is reduced, the degree and the period of time that the third linear valve 81 is opened are set according to the amount of fluid discharged from the second hydraulic-pressure delivery piping 63 to the reservoir tank 35 through the pressure-reducing valves 78 and 79, so that it is possible to return a certain amount of fluid from the first hydraulic-pressure supply piping 38 to the second hydraulic-pressure delivery piping 63 via the third hydraulic-pressure supply piping 80 to prevent the lack of the braking hydraulic pressure Pf.

As a result, it is possible to simplify the structure and reduce the manufacturing cost by commonizing the hydraulic pressure source for the master cylinder, and the hydraulic pressure source for the ABS 59 by using the hydraulic pump 32 and the accumulator 37 as the hydraulic pressure source. In addition, it is possible to secure proper braking force to perform highly precise control of the braking force.

In this embodiment, the total amount of fluid Qr to be discharged to reduce pressure is calculated by adding the amount of fluid Qrfr and Qrfl to be discharged to reduce pressure estimated for the front wheels FR and FL, and the required flow rate Qap is set by multiplying the amount of fluid Qr to be discharged to reduce pressure by the coefficient of the amount of returned fluid. Accordingly, by setting this coefficient of the amount of returned fluid to a value greater than one, it is possible to secure a sufficient, required flow rate Qap and to secure a proper braking hydraulic pressure Pf.

In addition, in this embodiment, the amount of fluid Qr to be discharged to reduce pressure is estimated from the period of time Ta and the period of time Tr required to increase and reduce pressure by using the ABS 59, respectively, as well as the braking hydraulic pressure Pf of the ABS, whereby it is made possible to set the required flow rate Qap that corresponds to the amount of fluid Qr to be discharged to reduce pressure with a high precision, and to secure a proper braking hydraulic pressure Pf.

In this embodiment, the operation-force absorbing means of the present invention is constituted of the communication passage 21 allowing the first and second pressure chambers R1 and R2 to communicate with each other, and the predetermined space $S_0$ between the input piston 12 and the pressurizing piston 13, whereby it is made possible to inhibit change in the reaction force to be applied to the brake pedal 14 with a simple construction. In addition, the communication passage 21 is provided with the reduced diameter portion by forming the seat portion 31, whereby it is made possible to generate thrust force by virtue of the diametrically reduced portion when the input piston 12 advances.

Second Embodiment

Figure 10A:
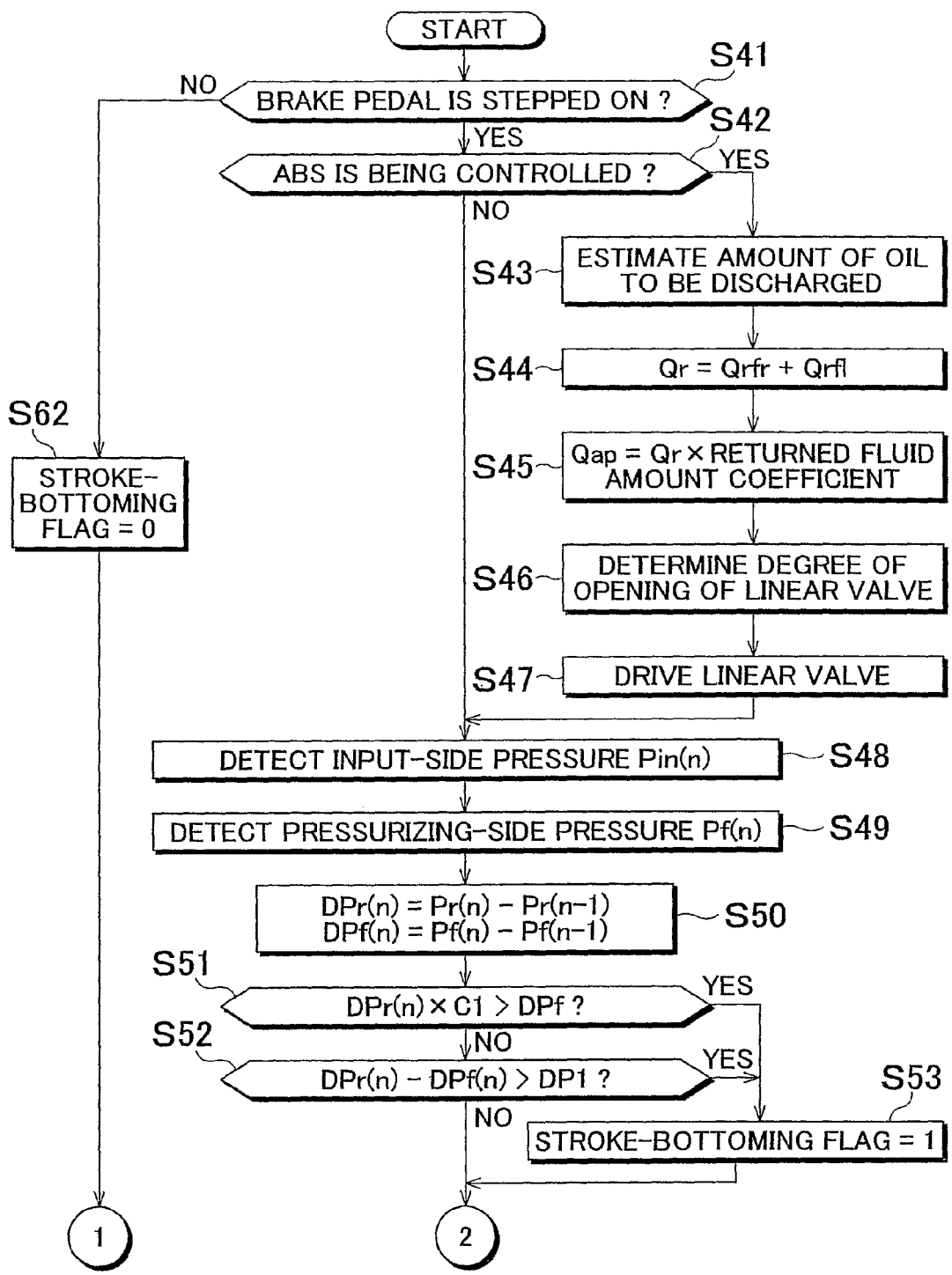
FIGS. 10A and 10B illustrate a flow chart showing control of the amount of fluid to be returned which is performed by the vehicular brake system according to the second embodiment of the present invention.
Figure 10B:
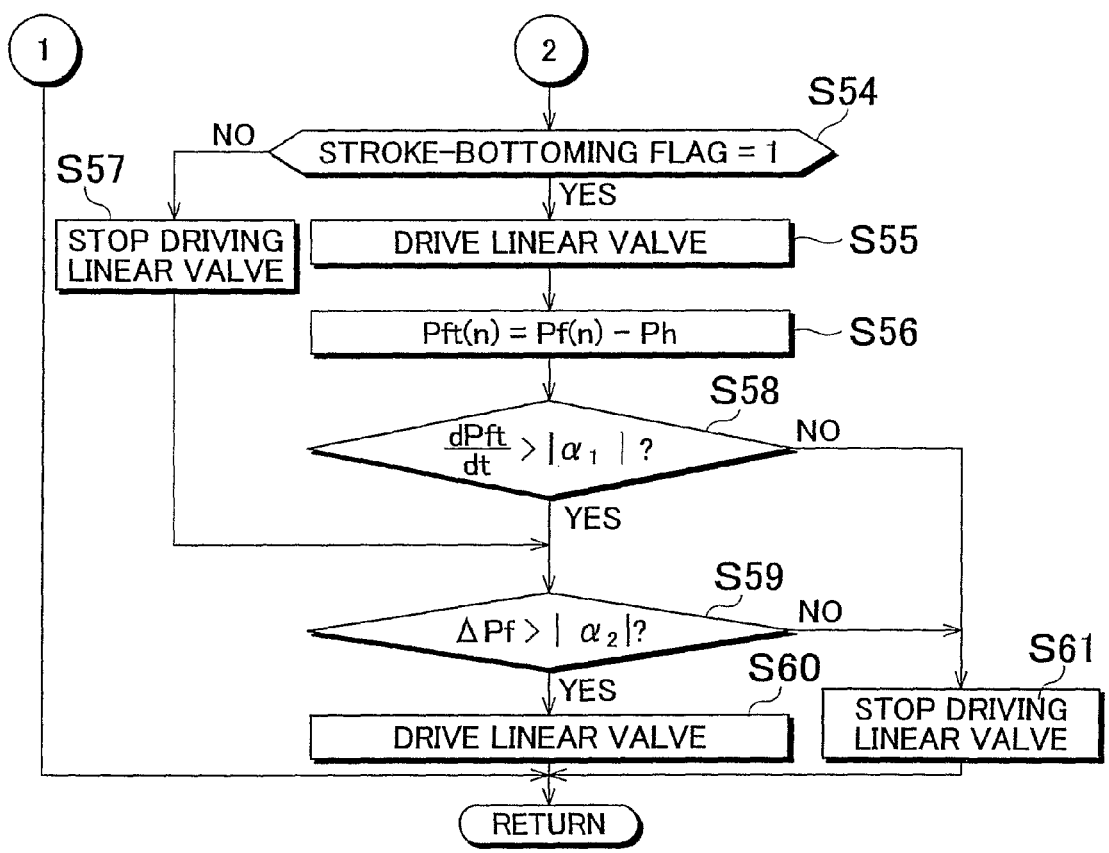
Figure 11:
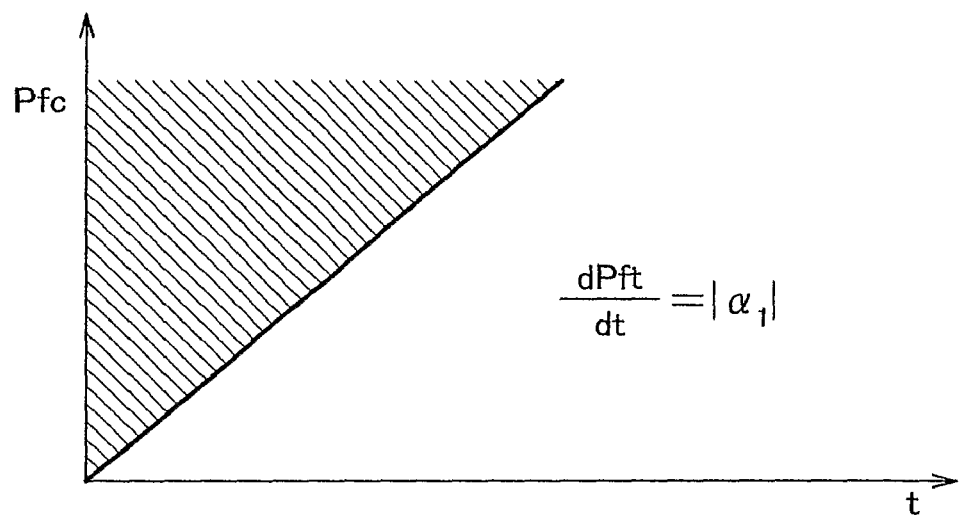
FIG. 11 is a graph used for determining the driving of the third linear valve according to the operation amount of the brake pedal.
Figure 12:
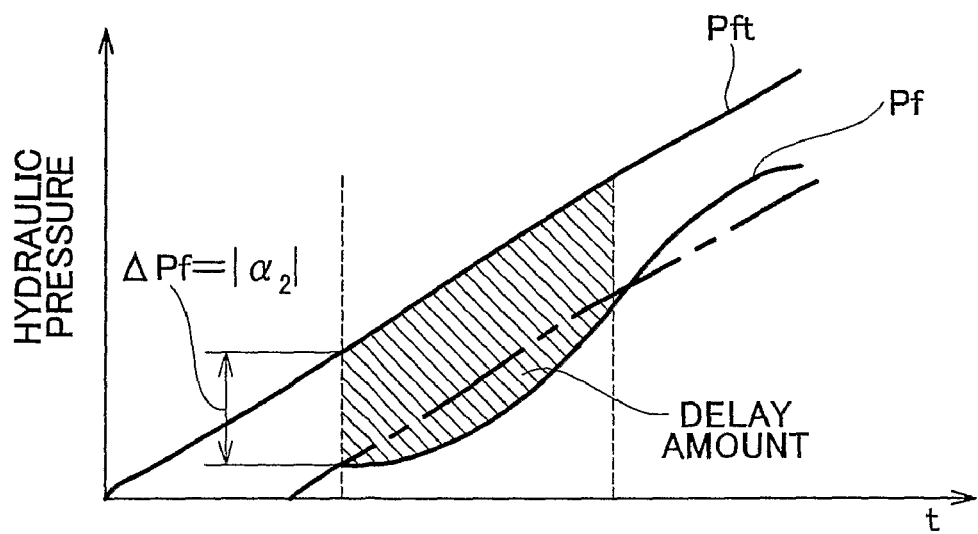
FIG. 12 is a graph used for determining the driving of the third linear valve according to the delay amount of the braking hydraulic pressure.

FIGS. 10A and 10B illustrate a flow chart showing control of the amount of fluid to be returned, which is performed by the vehicular brake system according to the second embodiment of the present invention. FIG. 11 is a graph used for determining the driving of the third linear valve according to the operation amount of the brake pedal. FIG. 12 is a graph used for determining the driving of the third linear valve according to the delay amount of the braking hydraulic pressure. The whole construction of the vehicular brake system of the second embodiment is substantially the same as that of the first embodiment, and will therefore be described with reference to FIG. 1. Members having functions similar to those described in relation to the first embodiment will be given the same reference symbols, and redundant description will be omitted.

With regard to the brake system of the second embodiment, as shown in FIGS. 1 and 10A, in step S41, it is determined whether the ON signal from the brake switch 93 is received, and if it is determined that the ON signal from the brake switch 93 is received, it is determined whether the ABS is being controlled, in step S42. If the ABS 59 is being controlled, the amount of fluid Qrfr and Qrfl to be discharged to reduce pressure (the discharged-fluid amount) is estimated for the front wheels FR and FL. The process of estimating the discharged-fluid amount is similar to that of the first embodiment described above, and description thereof will therefore be omitted.

Subsequently, in step S44, the total amount of fluid Qr to be discharged to reduce pressure is calculated by adding the amount of fluid Qrfr and Qrfl to be discharged to reduce pressure estimated for the front wheels FR and FL. In step S45, the required flow rate Qap is set by multiplying the amount of fluid Qr to be discharged to reduce pressure by the coefficient of the amount of returned fluid, which is 1.0 in this embodiment. In step S46, the degree of opening of the third linear valve 81 is determined. The method of determining the degree of opening of the third linear valve 81 is similar to that of the first embodiment described above, and description thereof will therefore be omitted. Once the third linear valve 81 is driven or opened in step S47, substantially the same amount of hydraulic fluid as the amount of fluid discharged from the second hydraulic-pressure delivery piping 63 to the reservoir tank 35 through the pressure-reducing valves 78 and 79 during the control of the ABS 59 is returned from the first hydraulic-pressure supply piping 38 to the second hydraulic-pressure delivery piping 63 via the third hydraulic-pressure supply piping 80, according to the degree of opening of the third linear valve 81.

Subsequently, in step 48, the pressure to be supplied to the master cylinder, that is, the braking hydraulic pressure Pr, is detected by the first pressure sensor 94. In step S49, the pressure increased by the master cylinder, that is, the braking hydraulic pressure Pf is detected by the second pressure sensor 95. In step S50, the difference $DPr_{(n)}$ between a current value $Pr_{(n)}$ and the preceding value $Pr_{(n-1)}$ of the braking hydraulic pressure Pr is calculated, and the difference $DPf_{(n)}$ between a current value $Pf_{(n)}$ and the preceding value $Pf_{(n-1)}$ of the braking hydraulic pressure Pf is calculated. Subsequently, in step S51, it is determined whether the value obtained by multiplying the difference $DPr_{(n)}$ by a coefficient C1 (0.7) is larger than the difference $DPf_{(n)}$, that is, whether the amount of change in the braking hydraulic pressure Pf is small. In step S52, it is determined whether the difference between the difference $DPr_{(n)}$ and the difference $DPf_{(n)}$ is larger than a predetermined value DP1, that is, whether the value of the braking hydraulic pressure Pf is small.

If, in step S51 described above, it is determined that the value obtained by multiplying the difference $DPr_{(n)}$ by the coefficient C1 is larger than the difference $DPf_{(n)}$, or if, in step S52, it is determined that the difference between the difference $DPr_{(n)}$ and the difference $DPf_{(n)}$ is larger than the predetermined value DP1, a stroke-bottoming flag is set to 1 in step S53. On the other hand, if the value obtained by multiplying the difference $DPr_{(n)}$ by the coefficient C1 is not larger than the difference $DPf_{(n)}$, and if, in step S52, it is determined that the difference between the difference $DPr_{(n)}$ and the difference $DPf_{(n)}$ is not larger than the predetermined value DP1, the stroke-bottoming flag remains unchanged at 0.

As shown in FIG. 10B, in step S54, it is determined whether the stroke-bottoming flag is 1. If it is determined that the stroke-bottoming flag is 1, the third linear valve 81 is driven or opened in step S55, and the value obtained by subtracting the hydraulic-pressure hysteresis amount Ph from the current value $Pf_{(n)}$ of the braking hydraulic pressure Pf detected is adopted as a desired output hydraulic pressure $Pft_{(n)}$. On the other hand, if it is determined that the stroke-bottoming flag is not 1 in step S54, driving the third linear valve 81 is stopped, that is, the third linear valve 81 is closed in step S57.

Specifically, if the determination result is "Yes" in step S51 or S52, there is a possibility that bottoming is caused by the reduction in the pressure (the braking hydraulic pressure Pf) in the second hydraulic-pressure delivery piping 63, and that it becomes impossible to sufficiently increase pressure through the pressure regulating control performed by the ABS 59. For this reason, in step S53, the stroke-bottoming flag is set to 1, and the third linear valve 81 is opened, so that the hydraulic fluid, the amount of which corresponds to the shortfall in the second hydraulic-pressure delivery piping 63, is supplied to the second hydraulic-pressure delivery piping 63 through the first hydraulic-pressure supply piping 38 and the third hydraulic pressure supply piping 80 via the third linear valve 81. Additionally, in this case, by setting the desired output hydraulic pressure $Pft_{(n)}$ low with the hydraulic-pressure hysteresis amount Ph taken into consideration, hunting of the pressurizing piston 13 which occurs after the determination concerning bottoming, is prevented.

Subsequently, in step S58, whether the differential value of the desired output hydraulic pressure $Pft_{(n)}$, that is, the rate of change thereof is larger than the absolute value of a predetermined value $\pi_1$ is determined from the map shown in FIG. 11. In other words, detection is made on whether the brake pedal 14 was suddenly operated for hard braking, in this step. If, in this step S58 it is determined that the rate of change of the desired output hydraulic pressure $Pft_{(n)}$ is larger than the absolute value of the predetermined value $\alpha_1$, whether the deviation value $\Delta Pf$ of the braking hydraulic pressure Pf is larger than the absolute value of a predetermined value $\alpha_2$ is determined from such a map as shown in FIG. 12, in step S59. After the desired output hydraulic pressure $Pft_{(n)}$ is set, the actual braking hydraulic pressure Pf is controlled with a certain delay (the delay amount=the deviation value $\Delta Pf$). A further delay can occur due to some causes. For this reason, whether the deviation value $\Delta Pf$ of the braking hydraulic pressure Pf is larger than the absolute value of the predetermined value $\alpha_2$ corresponding to the certain delay is determined in this step.

Accordingly, if, in step S58, it is determined that the rate of change of the desired output hydraulic pressure $Pft_{(n)}$ is larger than the absolute value of the predetermined value $\alpha_1$, and if, in step S59, the deviation value $\Delta Pf$ of the braking hydraulic pressure Pf is larger than the absolute value of the predetermined value $\alpha_2$, the hydraulic fluid the amount of which corresponds to the shortfall in the second hydraulic-pressure delivery piping 63 is supplied to the second hydraulic-pressure delivery piping 63 through the first hydraulic-pressure supply piping 38 and the third hydraulic pressure supply piping 80 via the third linear valve 81 by driving or opening the third linear valve 81, in step S60. On the other hand, if, in step S58, it is determined that the rate of change of the desired output hydraulic pressure Pft$_{(n)}$ is not larger than the absolute value of the predetermined value $\alpha_1$, or if, in step S59, the deviation value ΔPf of the braking hydraulic pressure Pf is not larger than the absolute value of the predetermined value $\alpha_2$, there is no shortfall hi the hydraulic fluid in the second hydraulic-pressure delivery piping 63. Therefore, driving the third linear valve 81 is stopped, that is, the third linear valve 81 is closed to stop supplying the hydraulic fluid from the first hydraulic-pressure supply piping 38 to the second hydraulic-pressure delivery piping 63 through the third hydraulic-pressure supply piping 80 via the third linear valve 81.

In the meantime, if the brake switch 93 is turned off in step S41, the stroke-bottoming flag is set to 0 in step S62, and the control is finished.

As described above, in the vehicular brake system of the second embodiment, the first hydraulic-pressure supply piping 38 extended from the accumulator 37 is connected to the first supply port 39 of the cylinder 11, and to the second hydraulic-pressure delivery piping 63 of the ABS 59 via the third hydraulic-pressure supply piping 80, and the third linear valve 81 is located in the third hydraulic-pressure supply piping 80. While the ABS 59 is being controlled, whether bottoming of the pressurizing piston 13 is occurring is determined by comparing the braking hydraulic pressure (the control hydraulic pressure) Pr and the braking hydraulic pressure Pf. Even if it is determined that the bottoming is occurring, it is possible to prevent the lack of the braking hydraulic pressure Pf by supplying a certain amount of hydraulic fluid from the first hydraulic-pressure supply piping 38 to the second hydraulic-pressure delivery piping 63 via the third hydraulic-pressure supply piping 80 by opening the third linear valve 81. Additionally, in this case, by setting the desired output hydraulic pressure Pft$_{(n)}$ low with the hydraulic-pressure hysteresis amount Ph taken into consideration, it is possible to prevent hunting of the pressurizing piston 13 which can occur after it is determined that the bottoming is occurring.

In addition, if it is determined that the rate of change of the desired output hydraulic pressure Pft$_{(n)}$ is larger than the absolute value of the predetermined value $\alpha_1$, the vehicular brake system of this embodiment determines that the driver has suddenly operated the brake pedal 14 for hard braking, and supplies the certain amount of hydraulic fluid from the first hydraulic-pressure supply piping 38 to the second hydraulic-pressure delivery piping 63 via the third hydraulic-pressure supply piping 80 by opening the third linear valve 81. Thus, it is possible to prevent the lack of the braking hydraulic pressure Pf during hard braking.

Although, in each embodiment of the vehicular brake systems described above, after the third linear valve 81 is opened, whether the pressurizing piston 13 is returned to the initial position is determined from the ON signal from the piston travel sensor 97, and the amount of change in the braking hydraulic pressure Pf, and then the third linear valve 81 is closed, the control method is not limited to this. For example, the degree and the period of time that the third linear valve 81 is opened, corresponding to the required amount of hydraulic fluid may be set, and the third linear valve 81 may be closed by using a timer. Alternatively, the third linear valve 81 may be closed after the control of the ABS 59 has been finished.

In each of the vehicular brake systems of the embodiments, the amount of fluid Qr that is discharged to reduce pressure is estimated from the period of time Ta and the period of time Tr required to increase and reduce pressure by using the ABS 59, respectively, as well as the braking hydraulic pressure Pf of the ABS, for example. However, the amount of fluid Qr that is discharged to reduce pressure may also be estimated from the travel of the pressurizing piston 13.

As described above, with the vehicular brake system according to the present invention, the hydraulic pressure source can be shared, and it is possible to secure the required amount of hydraulic fluid to be supplied so that highly precise control of the braking force can be performed. The vehicular brake system according to the present invention can therefore be suitably used for any kind of brake system.

The invention claimed is:

1. A vehicular brake system comprising:
    a cylinder;
    an input piston supported freely movably in an axis direction in the cylinder;
    an operation part connected to the input piston;
    a pressurizing piston disposed coaxially with the input piston and supported freely movably in an axis direction in the cylinder, wherein the pressurizing piston is configured to be pushed by the input piston when a malfunction occurs;
    a control-hydraulic-pressure setting unit that sets a control hydraulic pressure that corresponds to an operation force applied to the input piston through the operation part;
    a hydraulic-pressure supply device that generates braking hydraulic pressure by supplying the control hydraulic pressure set by the control-hydraulic-pressure setting unit to the pressurizing piston;
    a pressure regulating device configured to regulate a braking hydraulic pressure for each of wheels individually, wherein the braking hydraulic pressure is generated by the hydraulic-pressure supply device;
    a hydraulic pressure source connected to the hydraulic-pressure supply device and the pressure regulating device; and
    an operation-force absorbing mechanism that absorbs the operation force applied to the input piston through the operation part, wherein
    the hydraulic-pressure supply device supplies the control hydraulic pressure to a first pressure chamber disposed on one side of the input piston with respect to a moving direction thereof, or to a second pressure chamber disposed on the other side of the input piston,
    the hydraulic pressure source is configured to supply hydraulic fluid to the first pressure chamber or the second pressure chamber and to the pressure regulating device, and part of a supply line from the hydraulic pressure source to the first pressure chamber or the second pressure chamber and part of a supply line from the hydraulic pressure source to the pressure regulating device are common, and
    the operation-force absorbing mechanism includes a communication passage provided to the input piston that is configured to supply and discharge hydraulic fluid between the first pressure chamber and the second pressure chamber when open, so that a pushing force of the input piston is not transmitted to the pressurizing piston when the communication passage is open.

2. The vehicular brake system according to claim 1, wherein the pressure regulating device includes:
    a pressure-sustaining valve and a pressure-reducing valve for each wheel; and a flow control valve provided between the hydraulic pressure source and the pressure regulating device, and a degree and a period of time that the flow control valve is opened are set according to an amount of fluid discharged through the pressure-reducing valve.

3. The vehicular brake system according to claim 2, wherein
the pressure regulating device sets the degree of opening of the flow control valve based on the amount of fluid to be discharged, and a pressure difference between a hydraulic pressure supplied by the hydraulic pressure source and the braking hydraulic pressure generated by the hydraulic-pressure supply device.

4. The vehicular brake system according to claim 2, wherein
the pressure regulating device sets an amount of returned fluid that is more than the amount of fluid discharged through the pressure-reducing valve, and sets the degree and the period of time that the flow control valve is opened, according to the amount of returned fluid.

5. The vehicular brake system according to claim 2, wherein
the pressure regulating device determines whether bottoming of the pressurizing piston is occurring by comparing the control hydraulic pressure and the braking hydraulic pressure, and, if it is determined that the bottoming is occurring, sets the degree of opening of the flow control valve at a predetermined, desired degree of opening.

6. The vehicular brake system according to claim 5, wherein
the desired degree of opening of the flow control valve corresponds to a desired value of the braking hydraulic pressure on the pressurizing piston side, and is set lower than a degree corresponding to a desired value of the control hydraulic pressure on the input piston side.

7. The vehicular brake system according to claim 2, wherein
the pressure regulating device has an initial position detection device that detects whether the pressurizing piston is placed at an initial position, and,
when the initial position detection device detects that the pressurizing piston has returned to the initial position, the pressure regulating device closes the flow control valve.

8. The vehicular brake system according to claim 2, wherein
the pressure regulating device closes the flow control valve when the braking hydraulic pressure drops.

9. The vehicular brake system according to claim 2, wherein,
when a rate of change of the control hydraulic pressure exceeds a predetermined value, the pressure regulating device opens the flow control valve.

10. The vehicular brake system according to claim 1, further comprising a regulator that is housed in the pressurizing piston.

11. The vehicular brake system according to claim 10, wherein the communication passage, on a first end of the input piston that is adjacent to the first pressure chamber, includes a portion with decreasing diameters toward a second end of the input piston that is adjacent to the second pressure chamber.

12. The vehicular brake system according to claim 11, wherein the regulator includes a load transmitter that is movable, a tip portion of the load transmitter that extends through the pressurizing piston being contactable with the input piston at the portion of decreasing diameters to close the communication passage.

13. The vehicular brake system according to claim 12, wherein the regulator includes a poppet valve, the poppet valve being movable with contact from an end of the load transmitter that is opposite the tip portion.

14. The vehicular brake system according to claim 13, wherein a space between the cylinder and the pressurizing piston forms a third pressure chamber, a space adjacent to the input piston forms a fourth pressure chamber that is between the first and second pressure chambers, and a space between the load transmitter and the poppet valve forms a fifth pressure chamber.

15. The vehicular brake system according to claim 14, wherein the fourth pressure chamber forms a reaction-force chamber, such that a reacting hydraulic pressure supplied to the reaction-force chamber applies a reaction force to the operation part.

16. A vehicular brake system comprising:
a cylinder;
an input piston supported freely movably in an axis direction in the cylinder;
an operation part connected to the input piston;
a pressurizing piston disposed coaxially with the input piston and supported freely movably in an axis direction in the cylinder, wherein the pressurizing piston is configured to be pushed by the input piston when a malfunction occurs;
means for setting a control hydraulic pressure that corresponds to an operation force applied to the input piston through the operation part;
means for generating braking hydraulic pressure by supplying the control hydraulic pressure set by the means for setting to the pressurizing piston;
means for regulating a braking hydraulic pressure for each of wheels individually, wherein the braking hydraulic pressure is generated by the means for generating;
a hydraulic pressure source connected to the means for generating and the means for regulating; and
means for absorbing the operation force applied to the input piston through the operation part, wherein
the means for generating supplies the control hydraulic pressure to a first pressure chamber disposed on one side of the input piston with respect to a moving direction thereof, or to a second pressure chamber disposed on the other side of the input piston,
the hydraulic pressure source is configured to supply hydraulic fluid to the first pressure chamber or the second pressure chamber and to the means for regulating, and part of a supply line from the hydraulic pressure source to the first pressure chamber or the second pressure chamber and part of a supply line from the hydraulic pressure source to the means for regulating are common, and
the means for absorbing includes a communication passage provided to the input piston that is configured to supply and discharge hydraulic fluid between the first pressure chamber and the second pressure chamber when open, so that a pushing force of the input piston is not transmitted to the pressurizing piston when the communication passage is open.

* * * * *